United States Patent
De Hoff

[11] 3,875,748
[45] Apr. 8, 1975

[54] ACCUMULATOR PISTON STOP

[75] Inventor: Edward J. De Hoff, Dayton, Ohio

[73] Assignee: General Motors Corporation, Detroit, Mich.

[22] Filed: Nov. 26, 1973

[21] Appl. No.: 419,090

[52] U.S. Cl.............. 60/592; 60/413; 91/391 R; 60/548
[51] Int. Cl. ............................................ F15b 7/00
[58] Field of Search ............ 60/413, 418, 548, 592; 91/391 R; 138/31

[56] References Cited
UNITED STATES PATENTS

| | | | |
|---|---|---|---|
| 2,700,488 | 1/1955 | Rafferty | 138/31 |
| 3,288,166 | 11/1966 | Wagner | 138/31 |
| 3,633,363 | 1/1972 | Larsen | 60/548 |
| 3,638,528 | 2/1972 | Lewis | 60/413 |
| 3,719,044 | 3/1973 | Bach | 91/391 R |
| 3,751,912 | 8/1973 | Bach | 60/413 |

Primary Examiner—Martin P. Schwadron
Assistant Examiner—H. Burks, Sr.
Attorney, Agent, or Firm—K. H. MacLean, Jr.

[57] ABSTRACT

A hydraulic brake booster assembly including a housing with a pressure chamber therein adapted to receive high-pressure hydraulic fluid from a pressure source and produce a pressure force against a piston for pressurizing hydraulic brake fluid. When inadequate fluid pressure is received from the pressure source, valve means are actuated in response to movement of the brake pedal to release pressurized fluid from an accumulator storage chamber. The accumulator has a thick walled housing surrounding a space in which a piston is reciprocated to provide a variable volume storage space. A coil spring engages one side of the piston to move it in the space for discharging a maximum amount of fluid therefrom. The other end of the spring is axially retained by a relatively thin walled can member having a shoulder portion adapted to engage an expandable retainer member supported by the housing. An annular piston stop member adjacent the shoulder portion engages the piston to limit its travel against the spring and transmit pressure forces from the piston to the retainer and the housing rather than to the less rigid can member.

1 Claim, 3 Drawing Figures

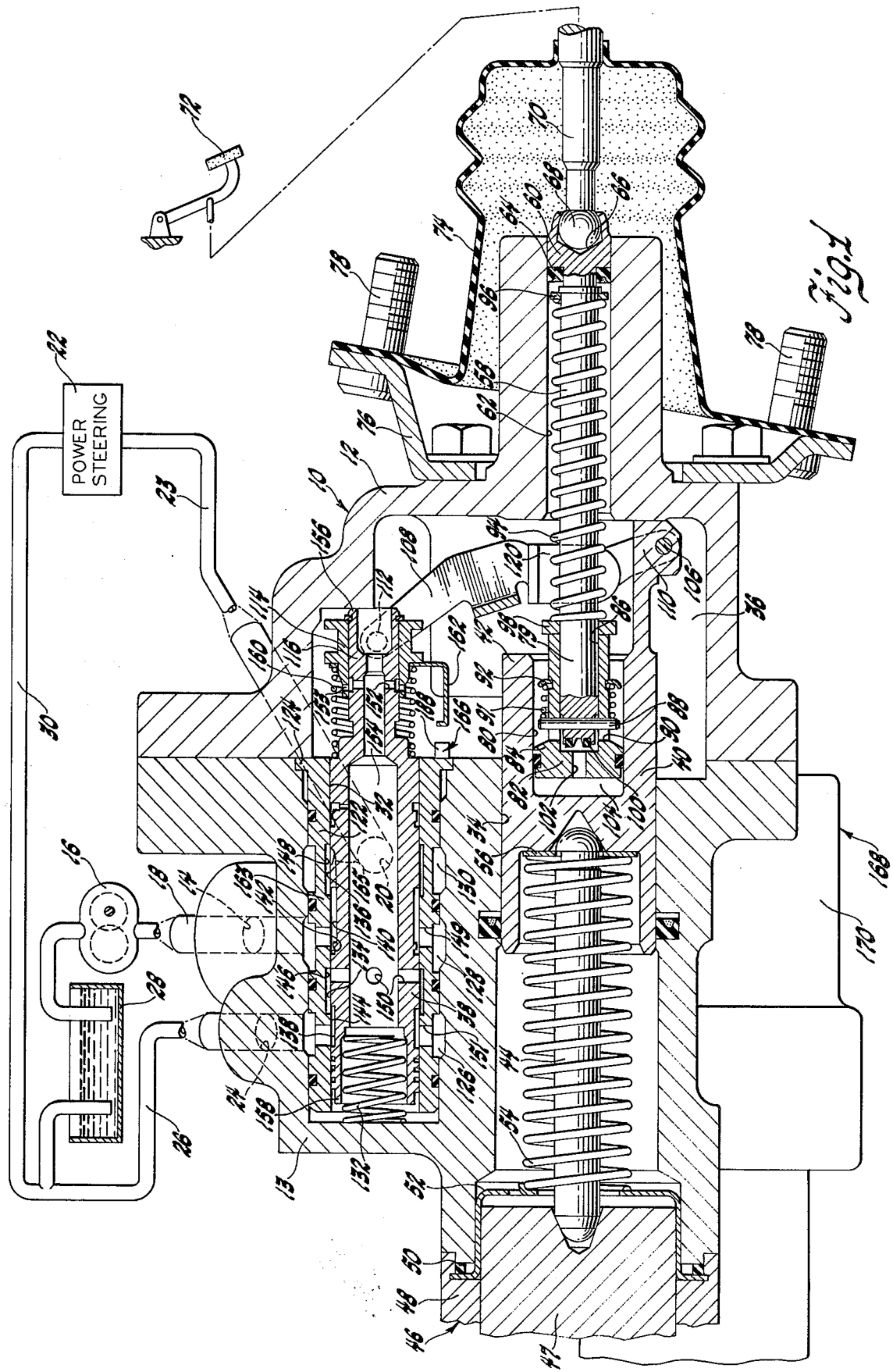

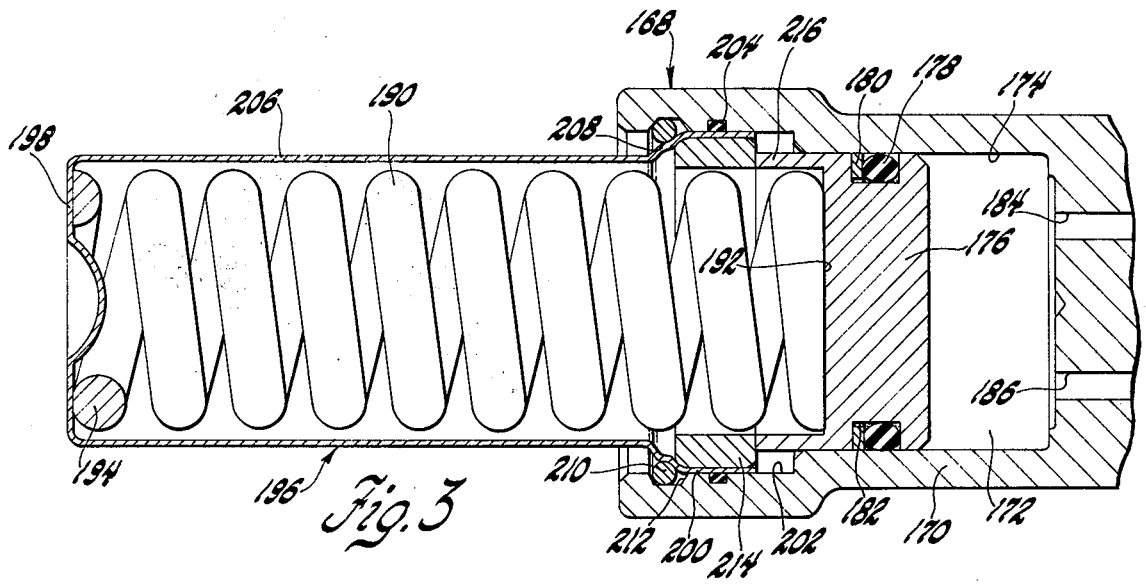
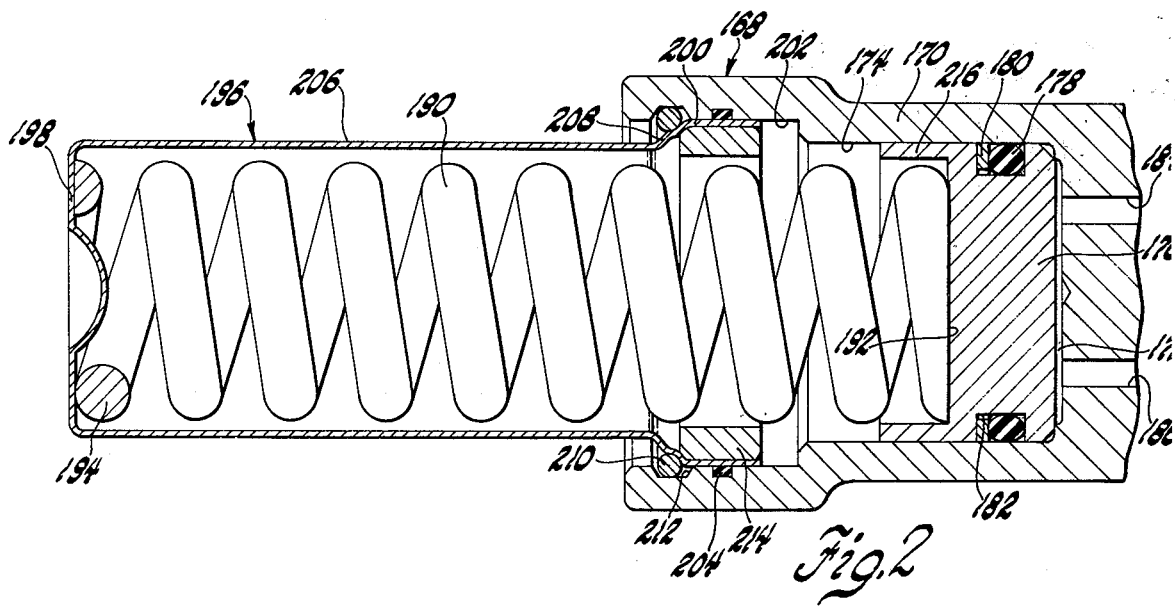

ACCUMULATOR PISTON STOP

Utilization of hydraulic pressure to drive fluid pressurization means for brake fluid is old. It is also known to use a vehicle power steering pump as a high pressure fluid source for activating hydraulic brake boosters. In this connection, it is known to provide a pressure accumulator to store a quantity of pressurized fluid for use in the event the pressure source fails to supply adequate pressurized fluid to the booster.

The subject invention provides an improved fluid accumulator for storing high pressure fluid. A variable volume space provided by a piston is reciprocally mounted in a cylinder bore of a thick walled accumulator housing. A coil spring engages one side of the piston to urge it toward a minimum volume operative position to discharge a maximum amount of hydraulic fluid from the storage space. A thin walled can member axially retains the other end of the coil spring and is attached to the accumulator housing by an expandible retainer member supported by the thick walled housing. An annular stop member is supported adjacent a shoulder portion of the can member to limit movement of the piston against the spring and transmit forces from the piston to the retainer and the thick walled housing rather than through the less rigid can member. This permits the can member to be manufactured by a drawing process from relatively thin material. It also prevents the coil spring from becoming solidly stacked up having adjacent coils contacting one another.

Therefore, an object of the present invention is to provide an improved pressure accumulator for use in a hydraulic brake booster and having a piston reciprocal against a coil spring within a storage space in a housing with the coil spring retained by a relatively thin walled can member fastened to the housing so as to transmit pressure forces directly from the piston to the housing in bypass relation to the can member.

Another object of the present invention is to provide an improved pressure accumulator for use in a hydraulic brake booster having a piston reciprocal against a coil spring within a storage space in a housing with the coil spring supported between the piston and a relatively thin walled can member which has a piston stop member therein to intercept movement of the piston and transmit pressure forces from the piston directly to the thick walled housing in bypass relation to the thin walled can member.

Further objects and advantages of the present invention will be more readily apparent from the following detailed description, reference being had to the accompanying drawings in which a preferred embodiment is illustrated.

IN THE DRAWINGS:

FIG. 1 is a schematic view of a power brake system including a sectioned view of a hydraulic brake booster assembly.

FIG. 2 is a sectioned view of the accumulator portion of the assembly shown in FIG. 1 in an uncharged operational mode.

FIG. 3 is a sectioned view of the subject accumulator portion similar to FIG. 2 but in a charged operative mode.

In FIG. 1 of the drawings, a hydraulically powered brake system is illustrated. Specifically, a hydraulic brake booster assembly 10 includes housings 12 and 13. The housing 13 has an inlet 14 communicated with the outlet or high pressure side of a vehicle power steering pump 16 by a conduit 18. An outlet port 20 in housing 13 is fluidly connected to the inlet of the vehicle power steering gear 22 by a conduit 23. The housing 13 also has an exhaust port 24 connected by a conduit 26 to a fluid reservoir 28. The outlet of the power steering assembly 22 is also connected to the reservoir 28 by conduit 30.

Assembly 10 has a first valve bore 32, a second power bore 34 and a pressure chamber 36 within the housings 12, 13. A spool valve 38 is reciprocally mounted in the bore 32 and is adapted to control communication between ports 14, 20, and 24. A power piston 40 is slidably mounted in the bore 34 and has an end 42 which projects into pressure chamber 36. A rod 44 connects piston 40 to a standard master cylinder assembly 46 which is mounted to the left of housing 13 and in which hydraulic brake fluid is pressurized by a piston 47 (only part of the master cylinder housing 48 is shown). An O-ring 50 is placed between the housings 13 and 48 to prevent fluid leakage therebetween. In addition, the outer edge of a spring retainer member 52 is supported by the master cylinder housing 48. The central portion of the spring retainer 52 engages one end of a coil spring 54 and the other end of spring 54 engages washer 56 located adjacent the power piston 40. The spring 54 urges the power piston to the right in FIG. 1 toward the illustrated brake release position.

A control rod 58 within housing 12 has an enlarged end portion 60 reciprocally mounted within a bore 62 in the housing 12. An annular seal 64 prevents fluid leakage from chamber 36. The end 60 has a socket 66 which engages a rounded portion 68 of a push rod 70. The push rod 70 is operably connected to a brake pedal assembly 72 for actuation of the brake system by a vehicle operator. The push rod 70 extends through a flexible boot 74 which may be made of a material such as rubber and which is affixed to a mounting flange 76 with fasteners 78 for attaching the brake booster assembly 10 to the vehicle. The other end 79 of control rod 58 extends into a bore 80 in the power piston 40. More particularly, the end 79 has a small piston 82 thereon which has an enlarged portion 84 adapted to reciprocate within the bore 80. Piston 82 has an opening 86 which encircles the end 79 of rod 58. This permits the piston 82 to reciprocate on the end 79 of rod 58 to the extent permitted by interaction between a pin 88 which is fastened to the end of rod 58 and a slot 90 in the piston 82.

A coil spring 91 encircles the piston 82 and is engaged at one end by pin 88 and at the other end by a retainer 92. Another spring 94 encircles the control rod 58 and extends from a retainer 96 to a washer member 98 adjacent the end of piston 82. The spring 94 has a greater spring force than spring 91 and thus, piston 82 is normally maintained against pin 88 in the position shown in FIG. 1.

When the brake pedal 72 and push rod 70 is activated to urge the control rod 58 to the left, pressurized hydraulic fluid is introduced to chamber 36 and presses against the end 42 of piston 40 to move piston 40, rod 44 and the master cylinder to the left. However, if the source 16 fails to provide adequate fluid pressure, the end 79 of the control rod 58 moves to the left in piston 82 to cause O-ring 100 to engage the end of the piston 82 and block the bleed port 102 which extends into chamber 104. This blocking of the bleed hole 102 traps hydraulic fluid within chamber 104 and prevents the control rod 58 and piston 40 from moving separately thus applying force directly upon the master cylinder piston 47 for manual actuation of the brakes.

One end of a lever 108 is attached by a pivotal fastener 106 to an extension of piston 40. The other end of the lever 108 is attached by a second pivotal fastener 112 to a piston member 114 which is mounted for reciprocation on a reduced diameter portion 116 of the spool valve 38. A bracket member 120 is attached to lever 108 and engages spring 94 to cause movement of the lever 108 with movements of the control rod 58. More particularly, the spring 94 yieldably urges the bracket 120 and connected lever 108 to the left as the control rod 58 is moved by actuation of the brake pedal 72.

The spool valve 38 is reciprocally mounted within the bore 32 which is formed within a sleeve member 122. Sleeve member 122 has an enlarged end portion 124 which axially positions it in the housing 13. Annular fluid passages 126, 128, and 130 are formed between the housing 13 and sleeve member 122 and are communicated respectively with the exhaust port 24, the inlet port 14, and the outlet port 20. A spring 132 normally urges the spool valve 38 to the right in FIG. 1 toward an inoperative position of the brake control.

Spool valve 38 includes annular lands 134 and 136 and groove 138 and 140 which cooperate with annular lands 142 and 144 and grooves 146 and 148 in the sleeve member 122 to control fluid communication into and out of pressure chamber 36. The inlet 14 is communicated by passage 149 in sleeve 122 with groove 140. Outlet 20 is communicated with the groove 148 and the return port 24 is communicated by passage 151 with groove 138. Passages 150, 152 and 154 in the valve 38 communicate the groove 134 with the pressure chamber 36. Spool valve 38 is shiftable from a normal first operative position defined by engagement of its end 156 with housing 12 to a second operative position defined by engagement of its other end 158 with housing portion 13.

The small piston member 114 is urged to the right in FIG. 1 by a spring 160 on the reduced diameter portion 116 of valve 38. This aligns passages 152 with a passage 153 in piston 114 to permit fluid flow from inlet 14 to the pressure chamber 36. The spring 160 also retains a valve actuator member 162 against the piston 114 for movement together. The function of the actuator 162 will be described hereinafter in connection with the discussion on the subject fluid accumulator.

When the brakes are applied, valve 38 is moved to the left in FIG. 1 toward the second operative position to cause land 136 on valve 38 to engage portion 163 of sleeve 122. Groove means 165 in valve 38 produce a fluid flow restriction between inlet 14 and outlet 20. The flow restriction through the groove means causes the fluid pressure to increase in the inlet bore 14 when the brakes are applied. A portion of the pressurized fluid is communicated to the pressure chamber 36 between lands 134 and 142, through the groove 146 and passages 150, 152, 153, and 154 into the pressure chamber 36. The fluid pressure within chamber 36 acts against the end 42 of piston 40 to urge the piston to the left in FIG. 1. This movement of piston 40 is transmitted by rod 44 to the master cylinder assembly 46 in which brake pressure is generated by the piston 47.

The previous paragraph describes the operation of the booster assembly during normal braking when adequate fluid pressure from the power steering pump 16 is available for braking action. During this period of operation, the spool valve 38 is in its second or leftward operative position. When the fluid pressure at inlet 14 is inadequate for power braking, increased pressure on the brake pedal 72 by the vehicle operator causes further leftward movement of the push rod 70, control rod 58, and lever 108. Movement of lever 108 forces the piston 114 against the spring 116 and causes passage 153 to move out of alignment with the passage 152 to block fluid communication between inlet 14 and pressure chamber 36. This blockage of the communication between inlet 14 and pressure chamber 36 prevents an undesirable abrupt reestablishment of fluid pressure in chamber 36 if an adequate pressure is communicated to inlet 14 during braking.

The movement of the piston 114 on the end of the valve 38 causes the extension 162 carried by piston 114 to engage a release valve member 166. The valve 166 is located in the outlet passage from a fluid accumulator 168 in alignment with extension 162. The fluid accumulator is best shown in FIGS. 2 and 3 and includes a thick walled and therefore relatively rigid wall portion 170 which partially defines an accumulator storage space 172. The storage space 172 is formed within a bore 174 encircled by wall 170. A piston 176 is reciprocally mounted in the bore 174 to provide a variable volume storage space. An O-ring 178 and member 180 are mounted within a groove 182 within the piston 176 to prevent fluid leakage from the chamber 172.

The storage space or chamber 172 of accumulator 168 is communicated with the inlet 14 of the booster assembly by a passage 184 which extends through the housing portion 13 and wall 170 to chamber 172. A check valve (not shown) is supported within passage 184 to provide one way fluid flow from the inlet 14 to the storage chamber 172. The fluid pressurization with chamber 172 reciprocates the piston 176 toward the left to increase the volume of chamber 172. An outlet passage 186 extends from the chamber 172 through wall portion 170 and housing 13 to the pressure chamber 36. The release valve 166 is positioned in the outlet passage 186 to selectively discharge pressurized hydraulic fluid into pressure chamber 36 in response to operation of the brake pedal 72. For a more detailed explanation of a specific preferred embodiment of the relief valve, reference is made to a copending patent application entitled "Accumulator Valve" with Donald M. Flory named as inventor and also assigned to General Motors Corporation.

A portion 188 of the relief valve is visible in FIG. 1 and is adapted to be engaged by the extension member 162 which is operably attached to piston 114. When the fluid pressure at inlet 14 is inadequate for power braking, increased pressure on the brake pedal 72 causes leftward movement of the push rod 70 and control rod 58. This causes lever 114 and extension 162 to move to the left on the end of spool valve 38 and to open valve 166. The fluid capacity of the accumulator is sufficient to provide several supplemental power brake applications.

Referring specifically to FIGS. 2 and 3, it can be seen that the piston 176 is engaged on one side by end 192 of coil spring 190. The coil spring tends to bias the piston toward the right in FIGS. 2 and 3 to decrease the volume of chamber 172 and therefore to discharge a maximum amount of fluid therefrom. In FIG. 2, the piston 176 is furthest to the right corresponding to a discharge operative condition of the accumulator. In FIG. 3, the piston 176 is positioned in its leftward operative position against the force of the coil spring 190 which corresponds to a fully charged operative condition of the accumulator. The second end 194 of the spring 190 is retained by a relatively thin walled can member 196 which has a closed end portion 198 which engages the end 194 of spring 190. The other end of the retainer member 196 is open and has an enlarged diameter flange portion 200 which is supportingly received in an enlarged bore 202 of housing 170. An O-ring 204 placed between the flange portion 200 and the wall portion 170 prevents fluid leakage therebetween. The flange portion 200 is integrally connected to the side portion 206 of the can member 196 by a shoulder portion 208. Can member 196 and spring 190 are secured to the wall means 170 by an expandable retainer 210 which is supported within a groove 212 in wall 170. Retainer 210 engages shoulder portion 208 of the can member 196 to axially retain the spring 190 with respect to wall member 170.

An annular piston stop member 214 is supported within the flange portion 200 of member 196. When piston 176 is moved to the left to a fully charged position shown in FIG. 3, a portion 216 on piston 176 engages the stop member 214 to limit further leftward movement of the piston 176 which occurs at a predetermined pressure level necessary to compress spring 190. At this predetermined pressure level, the coil spring 190 is axially compressed a predetermined amount and a pressure force dependent on the spring rate is exerted on end portion 198 of the can member 196. Further pressurization of the chamber 172 does not move the piston 176 further to the left nor does it compress spring 190 further. The pressure forces on the piston greater than necessary to move against stop means 214 are transferred by the stop member 214 through the expandable retainer 210 to the relatively thick and rigid wall portion 170.

The aforedescribed direct transfer of pressure forces from piston 176 to the rigid wall 170 through members 210, 214 is desirable to limit the force exerted on the thin-walled and relatively low strength member 196. Resultantly, the retainer or can member 196 can be manufactured by a drawing process from relatively thin gage material with resultant material and process savings over an alternative casting of a thick-walled member. Because of the subject arrangement for transmitting pressure forces, the strength of member 196 must only be sufficient to withstand the initial force of spring 190 as it is compressed to the extent shown in FIG. 3. A spring rate is choosen so that the force on member 196 is relatively small when compared to the total pressure forces which may be exerted on piston 176 when the chamber 172 is fully pressurized as described hereinafter.

The pressure level of the fully charged accumulator space 172 has been observed to be as high as 1450 psi which is the maximum pressure allowed in pump 16. In the preferred embodiment, the fluid exposed area of piston 168 is approximately 2.8 square inches. At this pressure level, the force on the retainer or can member 196 would be approximately 4,000 lbs. if the entire pressure force were transmitted through spring 190 to can member 196. However, since a major portion of that pressure force is transmitted directly from piston 176 to housing portion 170 through stop member 214 and expandable retainer 208, a relatively light retainer member can be utilized.

The embodiment shown in FIGS. 2, 3 illustrates the engagement between shoulder portion 208 and a rounded or chamfered left end of the member 214. The leftward force of piston 176 against member 214 desirably tends to bias member 210 radially outward as well as axially leftward in groove 212. In a slightly modified embodiment, the left end of member 214 was tapered to multiply the radial outward force exerted on member 210 through the shoulder portion. This also tends to expand the member 214 against the flange portion 200 which desirably provides a close fit of member 214 in portion 200 for restraining the flange portion from collapse due to the heavy spring load which may be as high as 1500 pounds.

Another modification which is desirable is to roll the end of flange 200 over the right end of member 214 to retain the members together. This also serves to enhance the strength of the flange portion 200 against collapsing.

Although the embodiment illustrated is a preferred embodiment, other embodiments may be adapted without falling outside the scope of the following claims.

I claim:

1. In a hydraulic power brake booster assembly: a housing defining a pressure chamber therein for exerting fluid pressure upon a brake cylinder member; said housing having fluid inlet and outlet means communicated with a hydraulic pressure source for passing high pressure hydraulic fluid to and from said pressure chamber; control valve means for establishing fluid communication between said inlet and outlet means and said pressure chamber in response to the movement of an operator actuated brake means; said control valve means being shiftable from a first operative position connecting said inlet and outlet means in bypass relation to said pressure chamber to a second operative position connecting said inlet means in fluid flow relation with said pressure chambers; pressure accumulator means fluidly connected to said pressure chamber for storing a quantity of pressurized fluid; second valve means for controlling fluid flow from said accumulator to said pressure chamber; said fluid accumulator having a rigid walled housing portion encircling a fluid storage space therein for containing pressurized fluid; a piston reciprocally supported within said fluid storage space whereby its volume is varied; a coil spring having one end engaging said piston thereby tending to move said piston in said storage space for reducing the volume thereof; a generally cup-shaped can member having an open end and an integral closed end respectively engaging said rigid walled housing and said coil spring; the open end of said can member having an enlarged diameter flange portion which is integrally attached to the main body of said can member by a shoulder portion; an annular stop member supported within said enlarged diameter flange portion adjacent said shoulder portion; said flange portion being supported by said rigid walled portion to align said spring with said piston; radially expandable means operably engaging a groove in said rigid walled portion and said shoulder portion for attaching said can member and stop member to said rigid walled portion whereby said piston engages said stop member after a predetermined movement against said spring to thereafter transmit fluid pressure forces from said piston through said stop means and said radially expandable securing means to said rigid walled portion.

* * * * *